(12) United States Patent
Wei et al.

(10) Patent No.: US 11,816,605 B2
(45) Date of Patent: Nov. 14, 2023

(54) PACKING METHOD AND SYSTEM FOR DEFECTIVE SHEET BASED ON BRANCH-AND-CUT ALGORITHM

(71) Applicant: Guangdong University of Technology, Guangzhou (CN)

(72) Inventors: Lijun Wei, Guangzhou (CN); Shaowen Yao, Guangzhou (CN); Qiang Liu, Guangzhou (CN); Ting Liu, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 18/154,792

(22) Filed: Jan. 13, 2023

(65) Prior Publication Data

US 2023/0196216 A1 Jun. 22, 2023

(30) Foreign Application Priority Data

Mar. 3, 2022 (CN) .......................... 202210210975.1

(51) Int. Cl.
*G05B 19/18* (2006.01)
*G06Q 10/04* (2023.01)

(52) U.S. Cl.
CPC ......... *G06Q 10/043* (2013.01); *G05B 19/182* (2013.01)

(58) Field of Classification Search
CPC ............................ G06Q 10/043; G05B 19/182
See application file for complete search history.

(56) References Cited

U.S. PATENT DOCUMENTS

2008/0288100 A1* 11/2008 Moisio ................. D21G 9/0009
700/127
2018/0369666 A1 12/2018 Huffa et al.

FOREIGN PATENT DOCUMENTS

| CN | 104598754 A | 5/2015 |
| CN | 110570038 A | 12/2019 |
| CN | 10909947 A | 3/2020 |

(Continued)

OTHER PUBLICATIONS

Lijun Wei, Qian Hu, Andrew Lim, Qiang Liu, A best-fit branch-and-bound heuristic for the unconstrained two-dimensional non-guillotine cutting problem, European Journal of Operational Research, vol. 270, Issue 2, 2018, pp. 448-474 (Year: 2018).*

(Continued)

*Primary Examiner* — Christopher E. Everett

(57) ABSTRACT

A packing method for a defective sheet based on branch-and-cut algorithm, including: acquiring sheet information, where the sheet information includes size information of the defect sheet, size information of a target block and position information of a defect; based on actual cutting requirements, establishing constraints; and establishing a primal problem model according to the constraints; converting the primal problem model into a relaxed problem model; checking and verifying the obtained solution by x-check method to determine whether the obtained solution meets the constraints of the primal problem model; outputting the optimal solution to obtain an optimal cutting plan that meets the actual cutting requirements; and cutting the defective sheet according to the optimal cutting plan. A system for implement the packing method is also provided.

4 Claims, 5 Drawing Sheets

(a)Start (b)Cutting the raw material sheet (c)Converting into relaxed problem

Verifying the obtained solution; if the solution does not meet requirements, adding a new constraint
Iteration (e)Final solution (d)Solving the relaxed problem

(56) References Cited

FOREIGN PATENT DOCUMENTS

CN            113177668 A     7/2021

OTHER PUBLICATIONS

Martin, Mateus, Reinaldo Morabito, and Pedro Munari. "Two-stage and one-group two-dimensional guillotine cutting problems with defects: a CP-based algorithm and ILP formulations." International Journal of Production Research 60.6 (2022): 1854-1873 (Year: 2022).*

Martin, Mateus, et al. "Models for the two-dimensional rectangular single large placement problem with guillotine cuts and constrained pattern." International Transactions in Operational Research 27.2 (2020): 767-793 (Year: 2020).*

Fayard, Didier, Mhand Hifi, and Vassilis Zissimopoulos. "An efficient approach for large-scale two-dimensional guillotine cutting stock problems." Journal of the Operational Research Society 49.12 (1998): 1270-1277 (Year: 1998).*

\* cited by examiner

PACKING METHOD AND SYSTEM FOR DEFECTIVE SHEET BASED ON BRANCH-AND-CUT ALGORITHM

CROSS-REFERENCE TO RELATED APPLICATIONS

This application claims the benefit of priority from Chinese Patent Application No. 202210210975.1, filed on Mar. 3, 2022. The content of the aforementioned application, including any intervening amendments thereto, is incorporated herein by reference in its entirety.

TECHNICAL FIELD

This application relates to packing technology, and more particularly to a packing method and system for a defective sheet based on a branch-and-cut algorithm.

BACKGROUND

Packing problem is how to determine the layout and cutting of a workpiece on a sheet material. A reasonable layout pattern will lead to high utilization of the flat area on the raw material, and save the raw materials as much as possible. Therefore, the reasonable layout is an effective measure to improve the material utilization rate, lower the production costs and enhance the workpiece quality. The problems such as the cutting of wooden sheets and glass all belong to two-dimensional packing optimization problems. However, due to the property and manufacturing process, the raw material may have some defects (such as knots in the wood, bubbles in the glass, contaminated area in the steel and holes in the natural leathers), and thus cannot be used in the production. Therefore, it is necessary to avoid these defective areas and make the utilization rate of raw materials as high as possible during the cutting process. In addition, there are several constraints needed to be met, such as "guillotine cutting" and "non-guillotine cutting", whether to limit the maximum quantity of goods, whether the cutting direction of goods can be rotated, etc. The "guillotine cutting" means that during the plate cutting, one cutting operation must be made from one side of the rectangular block to the opposite side to obtain two independent small rectangular blocks. However, for the "non-guillotine cutting", it is not required to limit the cut to go across both ends of the component.

The existing technology is mainly aimed to address the defect-free packing problems by using exact solution algorithm, intelligent optimization algorithm and heuristic algorithm. Currently, less attention has been paid to the packing problem of defective materials, in which the heuristic algorithm and the intelligent optimization algorithm are mainly employed. The heuristic algorithm is constructed based on intuition or experience, by which a feasible solution is obtained within a certain period of time, but its quality cannot be guaranteed. Moreover, the feasible solution obtained each time is unstable, and it cannot judge whether the feasible solution is the optimal solution. The intelligent optimization algorithm is a random searching algorithm generally based on biological intelligence or physical phenomena, mainly including simulated annealing algorithm and genetic algorithm. The simulated annealing algorithm may obtain the global optimal solution, and has gradually become a general method for solving the optimization problems. Nevertheless, it is limited by complicated solving process and low solving efficiency. The genetic algorithm enables satisfactory global searching, but has poor local searching ability, large time consumption, low evolution efficiency and slow convergence speed. Moreover, it is prone to fall into the local optimal solution.

SUMMARY

An objective of this application is to provide a packing method and system for a defective sheet based on a branch-and-cut algorithm, which can not only quickly and accurately find the optimal solution of the two-dimensional rectangular packing of defective sheets under the constraint of "non-guillotine cutting", but also improve the packing efficiency and utilization rate of the defective rectangular sheet in the actual application.

Technical solutions of this application are described as follows.

In a first aspect, this application provides a packing method for a defective sheet based on a branch-and-cut algorithm, comprising:

(A1) acquiring information of the defective sheet; wherein the information comprises size information of the defective sheet, size information of a target block and position information of a defect; based on actual cutting requirements, establishing constraints; and establishing a primal problem model according to the constraints;

(A2) horizontally cutting the defective sheet into a plurality of strips; obtaining an optimal solution of each of the plurality of strips; and converting the primal problem model into a relaxed problem model;

(A3) solving the relaxed problem model by a third-party solver to obtain a solution;

(A4) checking and verifying the solution obtained in step (A3) by using an x-check method to determine whether the solution obtained in step (A3) meets the constraints of the primal problem model; if yes, determining the solution is an optimal solution of the primal problem model; and proceeding to step (A6);

otherwise, adding a new constraint to the relaxed problem model, and proceeding to step (A5);

(A5) repeating step (A3); and (A6) outputting the optimal solution to obtain an optimal cutting plan that meets the actual cutting requirements; and cutting the defective sheet according to the optimal cutting plan.

In an embodiment, in step (A1), the primal problem model is shown as follows:

$$\text{Max } \Sigma_{i \in I} \Sigma_{x \in X_0} \Sigma_{y \in Y_0} v_i z_{xyi};$$

wherein I indicates a type of the target block; $X_0$ represents a first cutting position discrete set of the defective sheet $S_0$; $Y_0$ represents a second cutting position discrete set of the defective sheet $S_0$; $v_i$ represents a value of a target block $i$; and a binary decision variable $z_{xyi}$ represents a position of the target block $i$, and if a bottom-left corner of the target block $i$ is placed at a point $(x,y)$, the binary decision variable $z_{xyi}$ takes value 1.

In an embodiment, the constraints of the primal problem model are shown as follows:

$$\text{s.t. } \Sigma_{i \in I} \Sigma_{x=p-w_i+1}^{p} \Sigma_{y=q-h_i+1}^{q} z_{xyi} \leq 1, \forall x, \forall p \in X_0, \forall y, \forall \in Y_0 \quad (1)$$

$$\Sigma_{i \in I} \Sigma_{x=x_d-w_i+1}^{x_d+w_d} \Sigma_{y=y_d-w_i+1}^{y_d+h_d} z_{xyi} = 0, \forall x \in X_0, \forall y \in Y_0, \forall j \in D \quad (2);$$

and $$z_{x,y,i} \in \{0,1\}, \forall x \in X_0, \forall y \in Y_0, \forall i \in I \quad (3);$$

when the number of the target block is limited, a constraint (4) is added on the basis of the primal problem model, shown as follows:

$$\Sigma_{x \in X_0} \Sigma_{y \in Y_0} z_{x,y,i} \leq n_i, \forall i \in I \quad (4);$$

wherein $w_i$ is a width of the target block i; $h_i$ is a height of the target block i; $w_d$ is a width of a defective area; $h_d$ is a height of the defective area; $n_i$ represents the limited number of the target block i; and p and q indicate x-coordinate and y-coordinate of a point, respectively.

In an embodiment, in step (A2), the relaxed problem model is shown as follows:

$$Max \Sigma_{i \in I} \Sigma_{y \in Y_0} v_i z_{yi};$$

wherein a binary decision variable $z_{yi}$ is a variable ranging from 0 to 1, and if a bottom-left corner of a first slice of target block i is placed in a y-th bin, the binary decision variable $z_{yi}$ takes value 1.

In an embodiment, constraints of the relaxed problem model are shown as follows:

$$s.t \ \Sigma_{i \in I} \Sigma_{y \in h(j,q)} z_{yi} w_j \leq W - C_q, q \in Y_0 \quad (5);$$

and $$z_{yi} \in \{0,1\}, \forall y \in Y_0, \forall i \in I \quad (6);$$

wherein $z_{yi}$ is the variable ranging from 0 to 1; $v_i$ represents the value of the target block i; W indicates a total length of the defective sheet; $C_q$ indicates a length of a defect in a q-th strip; $Y_0$ represents the second cutting position discrete set of the defective sheet $S_0$; and h(j, q) indicates all feasible cutting position discrete sets in which the q-th strip is covered by a target block j.

In an embodiment, constraints in the x-check method are shown as follows:

$$[x_j, x_j + w_j] \Sigma_{y \in h(j,q)} z_{yi} = 0 \quad (8);$$

and $$[x_j^d, x_j^d + w_d] \Sigma_{y \in h(j,q)} z_{yi} = 0 \quad (9);$$

wherein $z_{yi}$ is the variable ranging from 0 to 1; h(j, q) indicates all feasible cutting position discrete sets in which the q-th strip is covered by the target block j; and $[x_j, x_j + w_j]$ and $[x_j^d, x_j^d + w_d]$ are respectively an interval value of the defective sheet. In an embodiment, in step (A4), when the solution does not meet the constraints of the primal problem model, the new constraint added to the relaxed problem model is shown as follows:

$$\Sigma_{i \in I} z_{p_j^s}^s \leq N-1 \quad (10);$$

wherein $p_j^s = \Sigma_{y \in Y_0} z_{yi}^s$ is an optimal solution of a relaxed problem model; and N indicates the number of the target block placed in the optimal solution $z_{yi}^s$ relaxed problem.

In an embodiment, in the relaxed problem model, the first cutting position discrete set and the second cutting position discrete set are acquired by:

acquiring the size information of the target block and the position information of the defect; subjecting the target block to linear combination to generate combined blocks varying in size; setting a coordinate origin; and generating the first cutting position discrete set and the second cutting position discrete set based on the coordinate origin, wherein the first cutting position discrete set and the second cutting position discrete set do not exceed an edge length of the defective sheet.

In a second aspect, this application provides a packing system for a defective sheet based on a branch-and-cut algorithm, comprising:

a memory;
a processor; and
a computer program stored in the memory;
wherein the computer program is configured to be executed by the processor; and the processor is configured to execute the computer program to implement the packing method mentioned above.

In a third aspect, this application provides a computer-readable storage medium, wherein the computer-readable storage medium is configured to store a computer program; and the computer program is configured to be executed by a processor to implement the method mentioned above.

Compared with the prior art, this application has the following beneficial effects.

With respect to this disclosure, the raw material sheet is horizontally cut into several horizontal strips, and the optimal solution of each strip is solved. In this way, the two-dimensional problem is converted into a one-dimensional problem (namely, the problem to be solved is converted from the primal problem into a relaxed problem), which greatly improves the solving efficiency of the packing plan. The method and system provided herein can quickly and accurately obtain the optimal solution for the packing with defects, such that they can be employed in actual packing of defective sheets to quickly obtain the high-efficiency packing plan, thereby effectively guiding the cutting production.

DETAILED DESCRIPTION OF EMBODIMENTS

Figure 1:
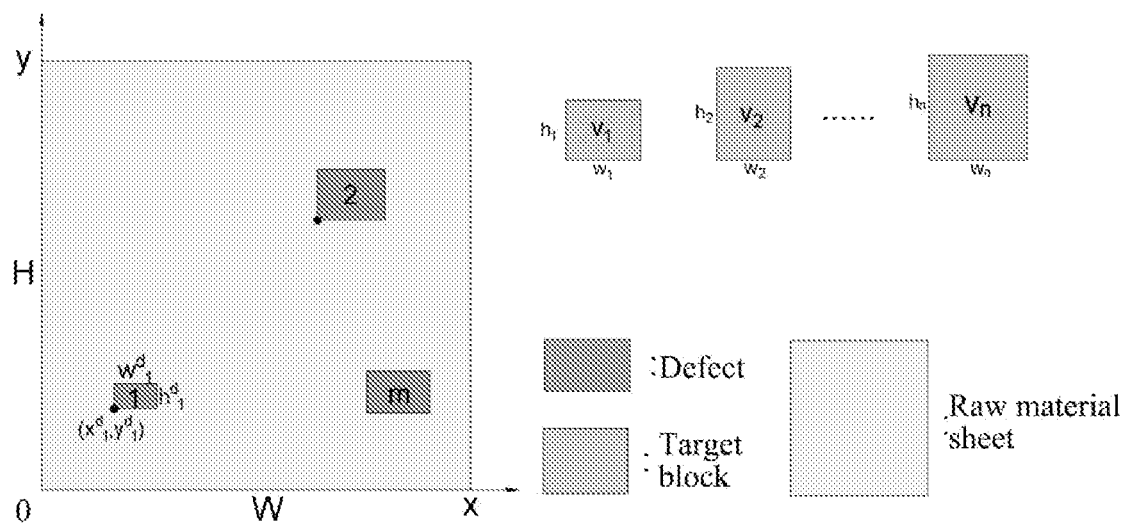
FIG. 1 is a schematic diagram showing packing of a two-dimensional (2D) rectangular defective sheet according to an embodiment of this disclosure.
Figure 2:
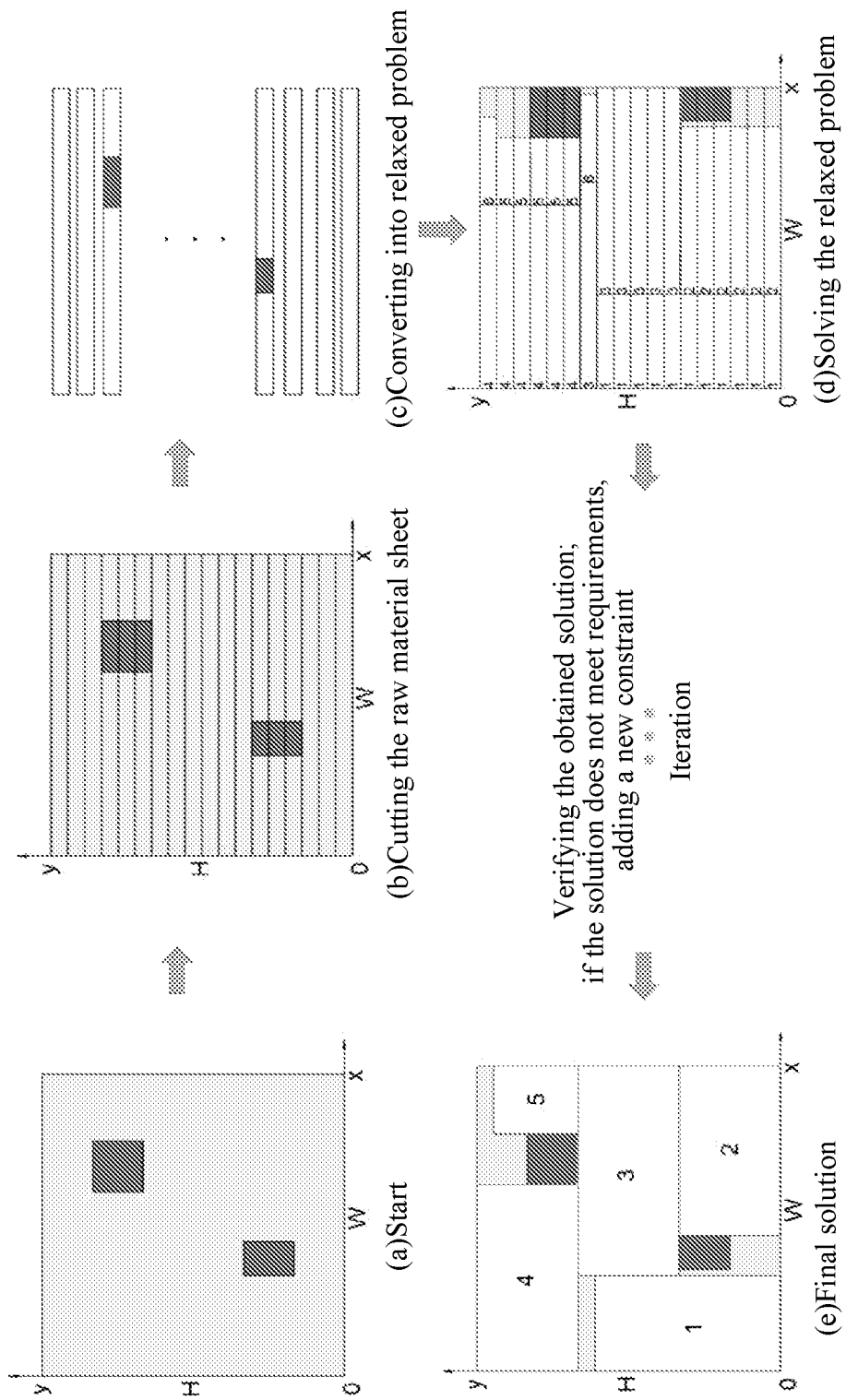
FIG. 2 is a schematic diagram of principles of a branch-and-cut algorithm according to an embodiment of this disclosure.
Figure 3:
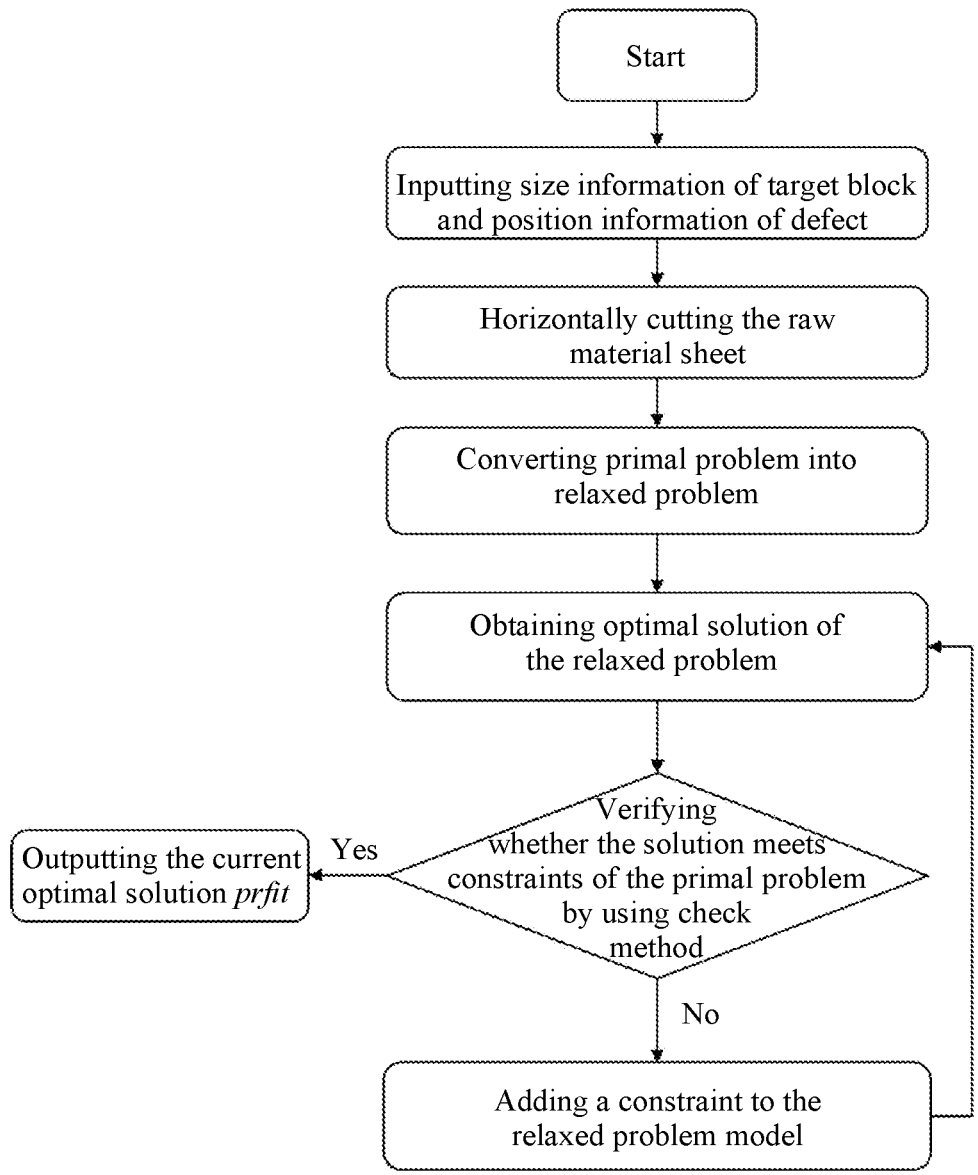
FIG. 3 is a flow chart of the branch-and-cut algorithm according to an embodiment of this disclosure.

The disclosure will be described in detail below with reference to embodiments illustrated in the accompanying drawings. The same or similar reference sign(s) refer to the same or similar elements or elements having the same or similar functions throughout this disclosure. The embodiments described below with reference to the accompanying drawings are intended to explain this disclosure, and should not be construed as a limitation of this disclosure.

It should be understood that as used herein, terms such as, "longitudinally", "transversely", "up", "down", "front", "rear", "left", "right", "vertically", "horizontally", "top", "bottom", "inside" and "outside" that indicates the orientations and positional relationships based on the orientations and positional relationships shown in the accompanying drawings, are only intended to facilitate the description of this disclosure and the simplification of the description, and not to indicate or imply that the referred device or element must have a particular orientation, or be constructed and operated in a particular orientation, and thus can not be understood as the limitations of the present disclosure. In addition, the features defined with "first" and "second" may explicitly or implicitly include one or more of the features to distinguish and describe the features, and cannot be understood as indicating or implying their relative importance or the number of indicated technical features.

In this disclosure, unless otherwise specified, the term "a plurality of" refers to two or more than two.

In this disclosure, unless otherwise expressly specified and limited, it should be noted that the terms "installation", "connection", and "link" should be understood in a broad sense, for example, the connection may be fixed connection, detachable connection or integrated connection; or can be mechanical connection or electrical connection; or can be direct connection or indirect connection through an intermediate medium; or can be internal communication between two elements. For those of ordinary skill in the art, the specific meanings of the above-mentioned terms in this application can be understood under specific situations.

Referring to FIGS. 1-5, provided herein is a packing method for a defective sheet based on a branch-and-cut algorithm.

The packing method for the defective sheet based on the branch-and-cut algorithm is performed by the following steps.

(A1) Information of the defective sheet is acquired. The information includes size information of the defective sheet, size information of a target block and position information of a defect. Based on actual cutting requirements, constraints are established. A primal problem model is established according to the constraints.

(A2) The defective sheet is horizontally cut into a plurality of strips. An optimal solution of each of the plurality of strips is obtained. The primal problem model is converted into a relaxed problem model.

(A3) A third-party solver solves the relaxed problem model to obtain a solution.

(A4) X-check method is used to check and verify the solution obtained in step (A3) to determine whether the solution obtained in step (A3) meets the constraints of the primal problem model. If yes, the solution obtained in step (A3) is determined to be an optimal solution of the primal problem model. Step (A6) is performed.

(A5) Step (A3) is repeated.

(A6) The optimal solution is output to obtain an optimal cutting plan that meets the actual cutting requirements. The defective sheet is cut according to the optimal cutting plan.

Specifically, in the actual production, it is necessary to perform a packing operation on the defective sheet with defects, so that the target plate cut from the defective sheet has no defects. Moreover, the utilization rate of the defective sheet needs to be improved. Currently, less attention has been paid to the packing problem of defective materials, in which the heuristic algorithm and the intelligent optimization algorithm are mainly employed. The heuristic algorithm is constructed based on intuition or experience, by which a feasible solution is obtained within a certain period of time. But the feasible solution obtained each time is unstable and unable, it cannot judge whether the feasible solution is the optimal solution. The intelligent optimization algorithm is a generally random searching algorithm generally based on biological intelligence or physical phenomena, mainly including simulated annealing algorithm and genetic algorithm. The simulated annealing algorithm may obtain the global optimal solution, has and is limited by low solving efficiency. The genetic algorithm has poor local searching ability, large time consumption, low evolution efficiency and slow convergence speed. Moreover, is prone to fall into the local optimal solution.

In order to solve the above problems, provided herein is a packing method and system for a defective sheet based on a branch-and-cut algorithm. Specifically, information of a defective sheet is acquired. The information includes size information of the defective sheet, size information of a target block and position information of a defect. Based on actual cutting requirements, constraints are established. A primal problem model is established according to the constraints. It should be noted that in this embodiment, the step of "Based on actual cutting requirements, constraints are established" can be understood as that the two-dimensional rectangular sheet with defects is subjected to packing in the "non-guillotine cutting" way. The "non-guillotine cutting" is one of the constrains, and is illustrated below with specific embodiments.

After establishing the primal problem model, a relaxed problem model is established based on the primal problem model. When the primal problem model is converted into the relaxed problem, the defective sheet is horizontally and equally cut into a plurality of strips. A third-party solver solves the relaxed problem model to obtain a solution. X-check method is used to check and verify the solution obtained in step (A3) to determine whether the solution obtained in step (A3) meets the constraints of the primal problem model. If yes, the solution obtained in step (A3) is determined to be an optimal solution of the primal problem model; otherwise, a new constraint is added to the relaxed problem model followed by continuous solving and verification to determine whether the solution meets the requirement, and performing iterative solution, until optimal solution is obtained. The optimal solution is output to obtain an optimal cutting plan that meets the actual cutting requirements. The defective sheet is cut according to the optimal cutting plan.

The defective sheet is horizontally and equally cut into a plurality of horizontal strips. The optimal solution of each of the plurality of horizontal strips is solved. In this way, the two-dimensional problem is converted into a one-dimensional problem (namely, the problem to be solved is converted from the primal problem into a relaxed problem), which can greatly improve the solving efficiency of the packing plan. Considering that the obtained solution is required to meet the constraints of the relaxed problem and the primal problem, x-check method is required to be employed for testing and selecting the solution. The packing method and system provided herein can quickly and accurately obtain the optimal solution for the packing of the defective sheet, such that they can be employed in actual packing of the defective sheet to quickly obtain the high-efficiency packing plan, thereby effectively guiding the cutting production.

In this embodiment, in step (A1), the primal problem model is shown as follows:

Max $\Sigma_{i \in I} \Sigma_{x \in X_0} \Sigma_{y \in Y_0} v_i z_{xyi}$;

where I indicates a type of the target block, $X_0$ represents a first cutting position discrete set of the defective sheet $S_0$, $Y_0$ represents a second cutting position discrete set of the defective sheet $S_0$, $v_i$ represents a value of a target block i;

and a binary decision variable $z_{xyi}$ represents a position of the target block i, and if a bottom-left corner of the target block i is placed at a point (x,y), the binary decision variable $z_{xyi}$ takes value 1.

In this embodiment, in a given plate S=(x, y, w, h), X(w) represents a cutting position discrete set along an X-axis direction; Y(h) represents a cutting position discrete set along a Y-axis direction. A defective sheet $S_0$ has a length of $W_o$, a height of $H_o$, and contains D defective areas with a width of $w_d$ (d∈D) and a height of $h_d$ (d∈D). The defective sheet $S_0$ is cut into 1={1, 2, . . . , n} different types of target blocks with a width of $w_i$ and a length of $h_i$ and a value of $v_i$ (non-negative value). The cut target block is not allowed to be overlapped with the defect areas. Moreover, a direction of the target block is required to be fixed and a rotation of the target blocks is not allowed. In this way, the sum of the value (area) of target blocks is maximized. A variable $z_{xyi}$ ranging from 0 to 1 is used to indicate whether the target block i is placed at a discrete point (x, y). If yes, the variable $z_{xyi}$=1. If no, the variable $z_{xyi}$=0. $v_i$ indicates a value (area) of a target block i; $X_0$ represents the first cutting position discrete set of the defective sheet $S_0$. $Y_0$ represents the second cutting position discrete set of the defective sheet $S_0$.

In this embodiment, the direction of the target block is required to be fixed and the rotation of the target blocks is not allowed. Moreover, the horizontal cutting is performed, which is one of the above-mentioned constraints "non-guillotine cutting".

In this embodiment, constrains of the primal problem model are shown as follows:

$$s.t. \sum_{i \in I} \sum_{x=p-w_i+1}^{p} \sum_{y=q-h_i+1}^{q} z_{xyi} \leq 1, \forall x, \forall p \in X_0, \forall y, \forall y \in Y_0 \quad (1)$$

$$\sum_{i \in I} \sum_{x=x_d-w_i+1}^{x_d+w_d} \sum_{y=y_d-w_i+1}^{y_d h_d} z_{xyi}=0, \forall x \in X_0, \forall y \in Y_0, \forall j \in D \quad (2)$$

and $$z_{xyi} \in \{0,1\}, \forall x \in X_0, \forall y \in Y_0, \forall i \in I \quad (3)$$

when the number of the target blocks is limited, constraint (4) is added on the basis of the primal problem model, shown as follows:

$$\sum_{x \in X_0} \sum_{y \in Y_0} z_{xyi} \leq n_i, \forall i \in I \quad (4)$$

where $w_i$ is a width of the target block i; $h_i$ is a height of the target block i; $w_d$ is a width of a defective area; $h_d$ is a height of the defective area; $n_i$ represents the limited number of the target block i; and p and q indicate x-coordinate and y-coordinate of a point.

In an embodiment, in step (A2), the relaxed problem model is shown as follows:

$$Max \sum_{i \in I} \sum_{y \in Y_0} v_i z_{yi};$$

where a binary decision variable $z_{yi}$ is a variable ranging from 0 to 1, and if a bottom-left corner of a first slice of target block i is placed in a y-th bin, the binary decision variable $z_{yi}$ takes value 1; I indicates the type of the target block; $X_0$ represents the first cutting position discrete set of the defective sheet $S_0$; $Y_0$ represents the second cutting position discrete set of the defective sheet $S_0$; and $v_i$ represents the value of the target block i.

In this embodiment, the defective sheet is cut horizontally into H (H=(1, 2, . . . , y, . . . , H)) unit strips, and the optimal solution of each strip is obtained. The relaxed problem model can be obtained by removing the x variable from the primal problem model.

In this embodiment, constraints of the relaxed problem model are shown as follows:

$$s.t \sum_{i \in I} \sum_{y \in h(j,q)} z_{yi} w_j \leq W - C_q, q \in Y_0 \quad (5)$$

and $$z_{yi} \in \{0,1\}, \forall y \in Y_0, \in i \in I \quad (6)$$

where $z_{yi}$ is the variable ranging from 0 to 1; $v_i$ represents the value of the target block i; W indicates a total length of the defective sheet; $C_q$ indicates a length of a defect in a q-th strip; $Y_0$ represents the second cutting position discrete set of the defective sheet $S_0$; and h(j. q) indicates all feasible cutting position discrete sets in which the q-th strip is covered by a target block j. In this embodiment, $z_{yi}$ indicates whether the target block i covers a y-th strip. If yes, $z_{yi}$=1. If not, $z_{yi}$=0. The constraint (5) means that a total length of the target block that covers the q-th strip does not exceed a usable length of the strip. Constraint (6) indicates a variable ranging from 0 to 1. h (j,q) indicates all feasible cutting position discrete sets in which the q-th strip is covered by a target block j, and is shown as follows:

$$h(j,q)=\{r_j \in Y_0 | q-h_j+1 \leq q\} \quad (7).$$

In this embodiment, constraints in the x-check method in step (A4) are shown as follows:

$$[x_j, x_j+w_j] \sum_{y \in h(j,q)} z_{yi}=1 \quad (8)$$

and $$[x_j^d, x_j^d+w_d] \sum_{y \in h(j,q)} z_{yi}=0 \quad (9);$$

where $z_{yi}$ is the variable ranging from 0 to 1; h(j,q) indicates all feasible cutting position discrete sets in which the q-th strip is covered by the target block j; and $[x_j, x_j+w_j]$ and $[x_j^d, x_j^d+w_d]$ are respectively an interval value of the defective sheet.

In this embodiment, equation (8) mainly verifies whether there is only one target block in the interval $[x_j, x_j+w_j]$, so as to ensure that the target blocks do not overlap with each other. Equation (9) mainly verifies whether there is a target block in the interval $[x_j^d, x_j^d+w_d]$, so as to ensure that the target block does not overlap with the defect area.

The x-check algorithm mainly detects whether the solution obtained by the relaxed problem is combined into a packing solution that meets the constraints of the primal problem. If yes, the solution obtained by the relaxed problem can be directly output as the optimal solution of the primal problem. Since the relaxed problem is obtained by dividing the primal problem into several sub-problems, the optimal solution for the relaxed problem ensures that the length is occupied to the greatest extent. Compared with the primal problem, the relaxed problem has weaker constraints, where the x-axis constraint is eliminated. Therefore, if the optimal solution obtained by the relaxed problem meets the constraints of the primal problem, it is verified that the obtained solution is an optimal solution of the primal problem.

In this embodiment, in step (A4), the new constraint is shown as follows:

$$\sum_{i \in I} z_{p_j^s}^s \leq N-1 \quad (10)$$

where $p_j^s = \in_{y \in Y_0} z_{yi}^s$, $z_{yi}^s$ is an optimal solution of a relaxed problem model; and N indicates the number of the target blocks placed in the optimal solution.

In this embodiment, when the solution obtained by the relaxed problem does not meet the requirements, the constraint (10) needs to be added on the basis of the slack model to further constrain the relaxed problem. After that, the obtained model is shown as follows. Gradual iterations are performed until the optimal solution is obtained.

$$\text{Max} \Sigma_{i \in I} \Sigma_{y \in Y_0} v_i z_{yi};$$

$$s.t \; \Sigma_{i \in I} \Sigma_{y \in h(j,q)} z_{yi} w_j \le W - C_q, q \in Y_0;$$

$$\Sigma_{i \in I} z_{P_j^s i} \le N-1, \forall z_{yi}^s,$$

the solution is not feasible;

$$z_{yi} \in \{0,1\}, \forall y \in Y_0, \forall i \in I.$$

In this embodiment, in the relaxed problem model, the first cutting position discrete set and the second cutting position discrete set are acquired as follows. The size information of the target block and the position information of the defect are required. The target block is subjected to linear combination to generate combined blocks varying in sizes. A coordinate origin is set. The first cutting position discrete set and the second cutting position discrete set are generated based on the coordinate origin. The first cutting position discrete set and the second cutting position discrete set do not exceed an edge length of the defective sheet.

In this embodiment, the above-mentioned steps are employed to calculate a feasible cutting position point set for the of the defective sheet, and apply the feasible cutting position discrete set to the solution of the model, so as to reduce the searching space. The size information of the target block and the position information of the defect are acquired. The target blocks are subjected to linear combination according to the length and width to generate combined blocks with different sizes. A Cartesian coordinate system is established. The coordinate origin and the right boundary point or upper boundary of the defect are added to the reference point set. The combined target block is traversed. If the combined target block exceeds the boundary of the defective sheet, the excess part is discarded until the traversal is completed, and the final cutting position discrete sets is output.

Figure 4:
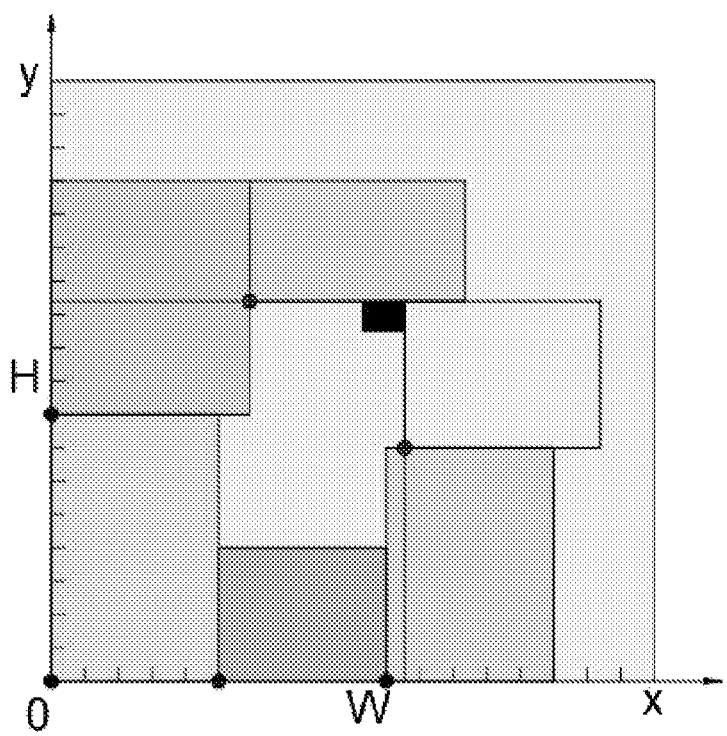
FIG. 4 is a schematic diagram of principles of a cutting position searching algorithm according to an embodiment of this disclosure.
Figure 5:
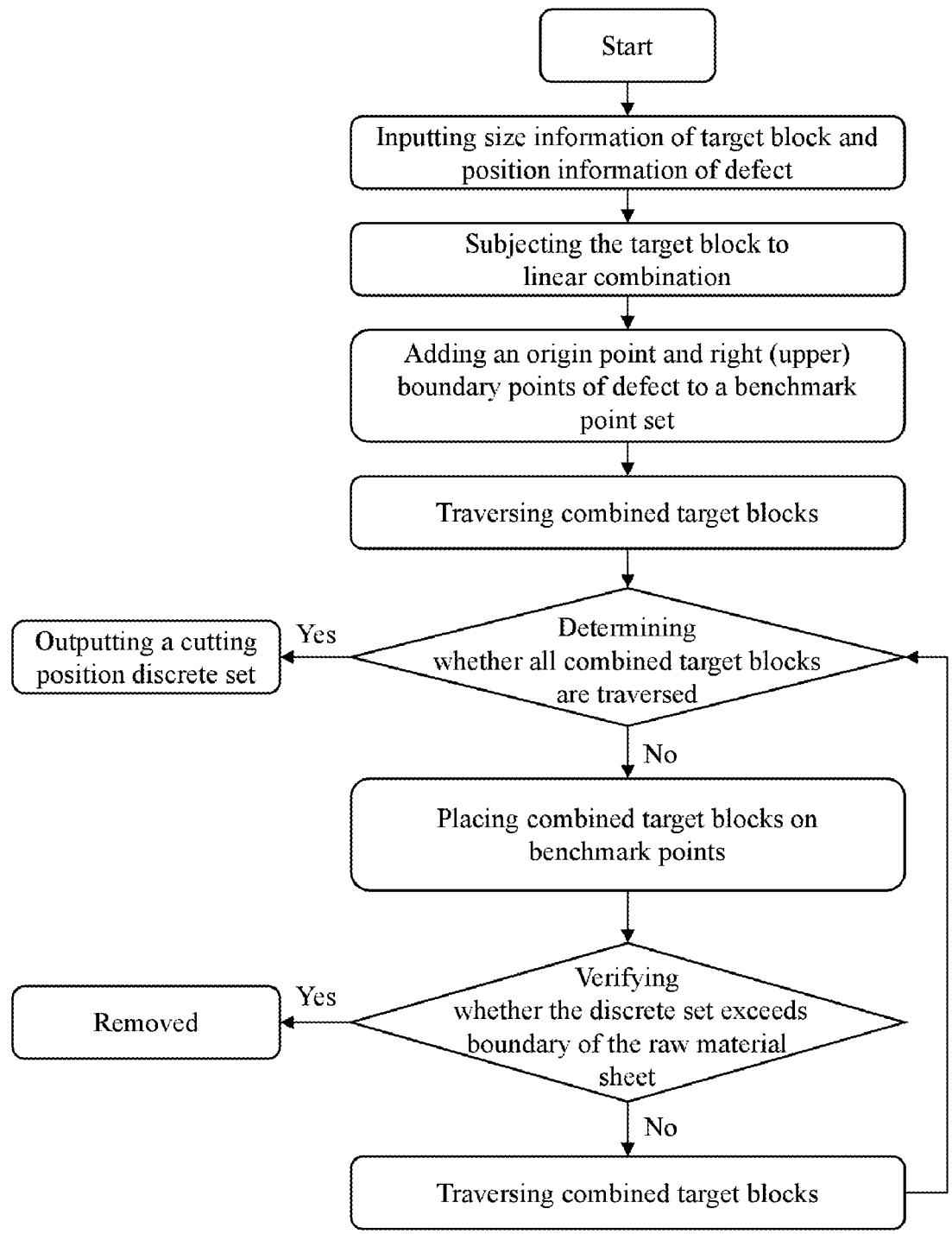
FIG. 5 is a flow chart of the cutting position searching algorithm according to an embodiment of this disclosure.

Referring to an embodiment shown in FIG. 4, the lower left corner of the defective sheet is set as an origin of Cartesian coordinates, and the combination of the length and width of the target block is based on the origin to generate two discrete sets that do not exceed the side length of the raw material. It is necessary to take the discrete set generated by the defect into consideration. For the cutting position discrete points along the x-axis direction, it is required to take the right boundary of the defect as a benchmark, such that some discrete sets that do not exceed the edge length of the raw material may be generated. For the cutting position discrete points along the y-axis direction, it is necessary to take the upper boundary of the defect as the benchmark, such that some discrete sets that do not exceed the length of the raw material are generated. Referring to the principle shown in FIG. 4, the combined blocks are close to the benchmarks, and the round points are the discrete points of the cutting positions. $N^v(x, y, w, h)$ represents a set of discrete points of vertical cutting lines on the defective sheets along the x-axis direction. $N^h(x, y, w, h)$ represents a set of discrete points of horizontal cutting lines on the defective sheets along the y-axis direction. The specific definitions of $N^v(x, y, w, h)$ and $N^h(x, y, w, h)$ are shown as follows.

$$N^v(w) = \{z/z = \Sigma_{i=1}^n \alpha_i w_i^s, 0 \le z \le w, \alpha_i \in \{0,1,2, \ldots\}, i \in I\};$$

$$N^h(h) = \{z/z = \Sigma_{i=1}^n \alpha_i h_i^s, 0 \le z \le h, \alpha_i \in \{0,1,2, \ldots\}, i \in I\};$$

$$N^v(x,y,w,h) = N^v(w) \not\subseteq \{z/z = x_j^d + w_j^d + v, j \in D(x,y,w,h) \\ v \in N^v(w) 0 \le z \le w\};$$

$$N^h(x,y,w,h) = N^v(h) \not\subseteq \{z/z = y_j^d + h_j^d + v, j \in D(x,y,w,h) v \in N^h \\ (h) 0 \le z \le h\};$$

where $w_i^s$ indicates a length of the target block i; $h_i^s$ indicates a width of the target block i; $\alpha_i$ is the number of the target block i; w and h are length of the defective sheet; $w_j^d$ is a length of the defect d; $h_j^d$ is a width of the defect d; $x_j^d$ and $y_j^d$ are coordinates of an lower left corner of the defect d; D(x, y, w, h) is a set of defects; and I is a set of target blocks.

In this embodiment, a packing system for a defective sheet based on a branch-and-cut algorithm is provided. The system includes a memory, a processor and a computer program stored in the memory. The computer program is configured to be executed by the processor; and the processor is configured to execute the computer program to implement the packing method mentioned above.

In this embodiment, a computer-readable storage medium is provided herein. The computer-readable storage medium is configured to store a computer program. The computer program is configured to be executed by a processor to implement the method mentioned above.

It should be understood for those skilled in the art that other components or operations according to the method and the system for packing a defective sheet based on branch-and-cut algorithm illustrated in an embodiment of this application are known, and will not be described in detail hereafter.

Each of the modules in the above-mentioned system for packing a defective sheet based on branch-and-cut algorithm can be implemented in whole or in part by software, hardware and combinations thereof. Each of the modules in the above-mentioned system can not only be embedded in or independent of the processor in the electronic device in the form of hardware, but also be stored in the memory of the electronic device in the form of software, so that the processor can call and execute the operations corresponding to the above modules.

It should be understood by those of ordinary skill in the art that all or part of the processes in the above-mentioned method can be completed by instructing relevant hardware via a computer program. The computer program can be stored in a non-volatile computer-readable storage medium. When the computer program is executed, the execution may include the processes of the method mentioned in the above embodiments. Any reference to memory, storage, database or other medium used in the various embodiments provided in this application may include non-volatile memory and/or volatile memory. Non-volatile memory may include read only memory (ROM), programmable read only memory (PROM), electrically programmable read-only memory (EPROM), electrically erasable programmable read-only memory (EEPROM), or flash memory. Volatile memory may include random access memory (RAM) or external cache memory. To illustrate but not to limit this application, RAM is available in various forms such as static random access memory (SRAM), dynamic random access memory (DRAM), synchronous dynamic random access memory (SDRAM), double data rate synchronous dynamic random access memory (DDRSDRAM), enhanced synchronous dynamic random access memory (ESDRAM), synchronous link (Synchlink) dynamic random access memory (SLDRAM), Rambus direct random access memory (RDRAM), direct rambus dynamic random access memory (DRDRAM) and Rambus dynamic random access memory (RDRAM), etc.

It is clearly understood by those skilled in the art that the division of each functional unit and module described above is merely exemplified for the convenience and conciseness of description. In actual application, the above-mentioned functions can be assigned to be completed by different functional units and modules according to the requirements, i.e., the internal structure of the device is divided into different functional units or modules to complete all or part of the above-described functions.

Described above are merely illustrative of the technical routes and features of the present application, which are not intended to limit the present application. It should be understood that various modifications, replacements and changes made by those skilled in the art without departing from the spirit of the application should still fall within the scope of the present application defined by the appended claims.

What is claimed is:

1. A packing method for a defective sheet based on a branch-and-cut algorithm, comprising:
   (A1) acquiring information of the defective sheet; wherein the information comprises size information of the defective sheet, size information of a target block and position information of a defect; based on actual cutting requirements, establishing constraints; and establishing a primal problem model according to the constraints;
   (A2) horizontally cutting the defective sheet into a plurality of strips; obtaining an optimal solution of each of the plurality of strips; and converting the primal problem model into a relaxed problem model;
   (A3) solving the relaxed problem model by a third-party solver to obtain a solution;
   (A4) checking and verifying the solution obtained in step (A3) by using an x-check method to determine whether the solution obtained in step (A3) meets the constraints of the primal problem model; if yes, determining the solution is an optimal solution of the primal problem model; and proceeding to step (A6); otherwise, adding a new constraint to the relaxed problem model, and proceeding to step (A5);
   (A5) repeating step (A3); and
   (A6) outputting the optimal solution to obtain an optimal cutting plan that meets the actual cutting requirements; and cutting the defective sheet according to the optimal cutting plan;
   in step (A1), the primal problem model is shown as follows:

$$\text{Max } \Sigma_{i \in I} \Sigma_{x \in X_0} \Sigma_{y \in Y_0} v_i z_{xyi};$$

wherein I indicates a type of the target block; $X_0$ represents a first cutting position discrete set of the defective sheet $S_0$; $Y_0$ represents a second cutting position discrete set of the defective sheet $S_0$; $v_i$ represents a value of a target block i; and $z_{xyi}$ represents a position of the target block i;
the constraints of the primal problem model are shown as follows:

$$s.t. \ \Sigma_{i \in I} \Sigma_{x=p-w_i+1}^{p} \Sigma_{y=q-h_i+1}^{q} z_{xyi} \leq 1, \forall x, \forall p \in X_0, \forall y, \forall \in Y_0 \quad (1)$$

$$\Sigma_{i \in I} \Sigma_{x=x_d-w_i+1}^{x_d+w_d} \Sigma_{y=y_d-w_i+1}^{y_d+h_d} z_{xyi} = 0, \forall x \in X_0, \forall y \in Y_0, \forall j \in D \quad (2);$$

and $$z_{xyi} \in \{0,1\}, \forall x \in X_0, \forall y \in Y_0, \forall i \in I \quad (3);$$

when the number of the target block is limited, a constraint (4) is added on the basis of the primal problem model, shown as follows:

$$\Sigma_{x \in X_0} \Sigma_{y \in Y_0} z_{xyi} \leq n_i, \forall i \in I \quad (4);$$

wherein $w_i$ is a width of the target block i; $h_i$ is a height of the target block i; $w_d$ is a width of a defective area; $h_d$ is a height of the defective area; $n_i$ represents the limited number of the target block i; and p and q indicate x-coordinate and y-coordinate of a point, respectively;
in step (A2), the relaxed problem model is shown as follows:

$$\text{Max } \Sigma_{i \in I} \Sigma_{x \in Y_0} v_i z_{yi};$$

wherein $z_{yi}$ is a variable ranging from 0 to 1;
constraints of the relaxed problem model are shown as follows:

$$s.t \ \Sigma_{i \in I} \Sigma_{y \in h(j,q)} z_{yi} w_j \leq W - C_q, q \in Y_0 \quad (5);$$

and $$z_{yi} \in \{0,1\}, \forall y \in Y_0, \forall i \in I \quad (6);$$

wherein $z_{yi}$ is the variable ranging from 0 to 1; $v_i$ represents the value of the target block i; W indicates a total length of the defective sheet; $C_q$ indicates a length of a defect in a q-th strip; $Y_0$ represents the second cutting position discrete set of the defective sheet $S_0$; and h(j, q) indicates all feasible cutting position discrete sets in which the q-th strip is covered by a target block j;
constraints in the x-check method are shown as follows:

$$[x_j, x_j + w_j] \Sigma_{y \in h(j,q)} z_{yi} = 0 \quad (8);$$

and $$[x_j^d, x_j^d + w_d] \Sigma_{y \in h(j,q)} z_{yi} = 0 \quad (9);$$

wherein $z_{yi}$ is the variable ranging from 0 to 1; h(j, q) indicates all feasible cutting position discrete sets in which the q-th strip is covered by the target block j; and $[x_j, x_j + w_j]$ and $[x_j^d, x_j^d + w_d]$ are respectively an interval value of the defective sheet;
in step (A4), when the solution does not meet the constraints of the primal problem model, the new constraint added to the relaxed problem model is shown as follows:

$$\Sigma_{i \in I} z_{p_j}^s \leq N - 1 \quad (10);$$

wherein $p_j^s = \Sigma_{y \in Y_0} z_{yi}^s$, $z_{yi}^s$ is an optimal solution of a relaxed problem model; and N indicates the number of the target block placed in the optimal solution $z_{yi}^s$.

2. The packing method of claim 1, wherein in the relaxed problem model, the first cutting position discrete set and the second cutting position discrete set are acquired by:
acquiring the size information of the target block and the position information of the defect; subjecting the target block to linear combination to generate combined blocks varying in size; setting a coordinate origin; and generating the first cutting position discrete set and the second cutting position discrete set based on the coordinate origin, wherein the first cutting position discrete set and the second cutting position discrete set do not exceed an edge length of the defective sheet.

3. A packing system for a defective sheet based on a branch-and-cut algorithm, comprising:
 a memory;
 a processor; and
 a computer program stored in the memory;
 wherein the computer program is configured to be executed by the processor; and the processor is configured to execute the computer program to implement the packing method of claim 1.

4. A non-transitory computer-readable storage medium, wherein the computer-readable storage medium is configured to store a computer program; and the computer program is configured to be executed by a processor to implement the method of claim 1.

* * * * *